United States Patent [19]

Proctor

[11] Patent Number: 5,961,071
[45] Date of Patent: Oct. 5, 1999

[54] CARGO POD FOR LIGHT AIRCRAFT

[76] Inventor: John Proctor, 356 Rivershore Dr., Roseburg, Oreg. 97470

[21] Appl. No.: 08/896,358

[22] Filed: Jul. 18, 1997

[51] Int. Cl.$^6$ ................................. B64C 1/20; B64C 1/22
[52] U.S. Cl. ..................................... 244/118.2; 244/118.1
[58] Field of Search ............................ 244/118.2, 118.1, 244/131, 133, 129.4, 129.5; 292/8, 100, 101, 161, 162, DIG. 49

[56] References Cited

U.S. PATENT DOCUMENTS

| | | | |
|---|---|---|---|
| 2,472,947 | 6/1949 | Hlobil | 244/118.1 |
| 2,557,962 | 6/1951 | Greene | 244/118.2 |
| 3,481,567 | 12/1969 | Stearman | 244/118.2 |
| 3,778,011 | 12/1973 | Cannon | 244/137.1 |
| 4,531,769 | 7/1985 | Glancy | 292/113 |
| 5,002,002 | 3/1991 | Awalt, Jr. | 114/210 |
| 5,165,148 | 11/1992 | Fleischer et al. | 24/494 |
| 5,462,318 | 10/1995 | Cooke | 292/200 |
| 5,820,075 | 9/1998 | Speakes et al. | 244/118.2 |

FOREIGN PATENT DOCUMENTS

| | | | |
|---|---|---|---|
| 139295 | 3/1920 | United Kingdom | 244/118.1 |
| 512192 | 8/1939 | United Kingdom | 244/129.4 |

OTHER PUBLICATIONS

Cessna Illustrated Parts Catalog, p. 316.

*Primary Examiner*—Charles T. Jordan
*Assistant Examiner*—Patricia L. Zuniga
*Attorney, Agent, or Firm*—Hedman, Gibson & Costigan, P.C.

[57] ABSTRACT

A cargo pod for light aircraft forming a sealed enclosure with an access door therein, the pod being attached to the aircraft through the use of over center latches. The cargo pod is made of a fiberglass laminate and has skids for sliding the pod when detached from the aircraft.

17 Claims, 8 Drawing Sheets

CARGO POD FOR LIGHT AIRCRAFT

FIELD OF THE INVENTION

The present invention relates to an accessory for light aircraft. More particularly, the invention relates to a cargo compartment for attachment to a light aircraft.

BACKGROUND OF THE INVENTION

Light aircraft such as CESSNA models 180, 182, 185, 205, 206, 207 and 208 generally have limited cargo storage. As such, cargo compartments such as pods have been developed for attachment to such aircraft.

The known cargo pods have not been entirely satisfactory, however, being little more than a half-shell which is attached to the bottom of the aircraft by a semi-permanent bolt-on attachment. The known pods have been shown to be fairly weak, difficult to attach and detach to the aircraft, difficult to gain access to the contents stored therein and unable to provide integrity for the contents.

As such, it is an object of the present invention to provide a strong cargo pod which can be easily attached to and detached from a light aircraft.

It is a further object to provide a cargo pod which provides integrity to the contents thereof.

It is an additional object of the invention to provide a pod which can be moved easily when detached.

SUMMARY OF THE INVENTION

These and other objectives are achieved by the present cargo pod comprising:

a. a sealable enclosure b. access means for accessing the interior of the sealable enclosure; and c. mounting means comprising one or more over center latches to secure the enclosure to the aircraft.

Preferably, the sealable enclosure comprises a body portion and a top portion which are permanently sealed together to form an integral capsule, providing integrity of the pod contents and improving strength of the pod. The exterior of the lid portion preferably has intermediate means attached thereto which acts as a surface facing between the capsule and the aircraft when attached. The bottom exterior of the body portion preferably has skids or runners formed thereon to protect the pod during handling, allowing the pod to be pulled in a sled fashion on snow or grass when removed from the aircraft.

The capsule is preferably made of fiberglass laminate construction for lightweight strength. The floor and door preferably have a foam layer for additional strength and rigidity. A single access door is provided on the capsule, preferably being a large removable "plug" type door located on the side of the capsule.

The preferred latches for attaching the pod to the aircraft comprise an over center latch where the attachment arm engages a retention member on the aircraft. When the pod is put into place using a positioning member, the engagement arm is extended to engage the retention member and the cam actuator is pushed down, to its locked position, causing the engagement arm to retract to a closed position. The actuator is then maintained in its locked position by securing means.

BRIEF DESCRIPTION OF THE DRAWINGS

The following drawings, in which like reference characters refer to like parts, are included for illustration purposes only and are not intended to limit the invention in any manner whatsoever. The scope of the invention is limited solely by the appended claims.

DETAILED DESCRIPTION OF THE PREFERRED EMBODIMENT

Figure 1:
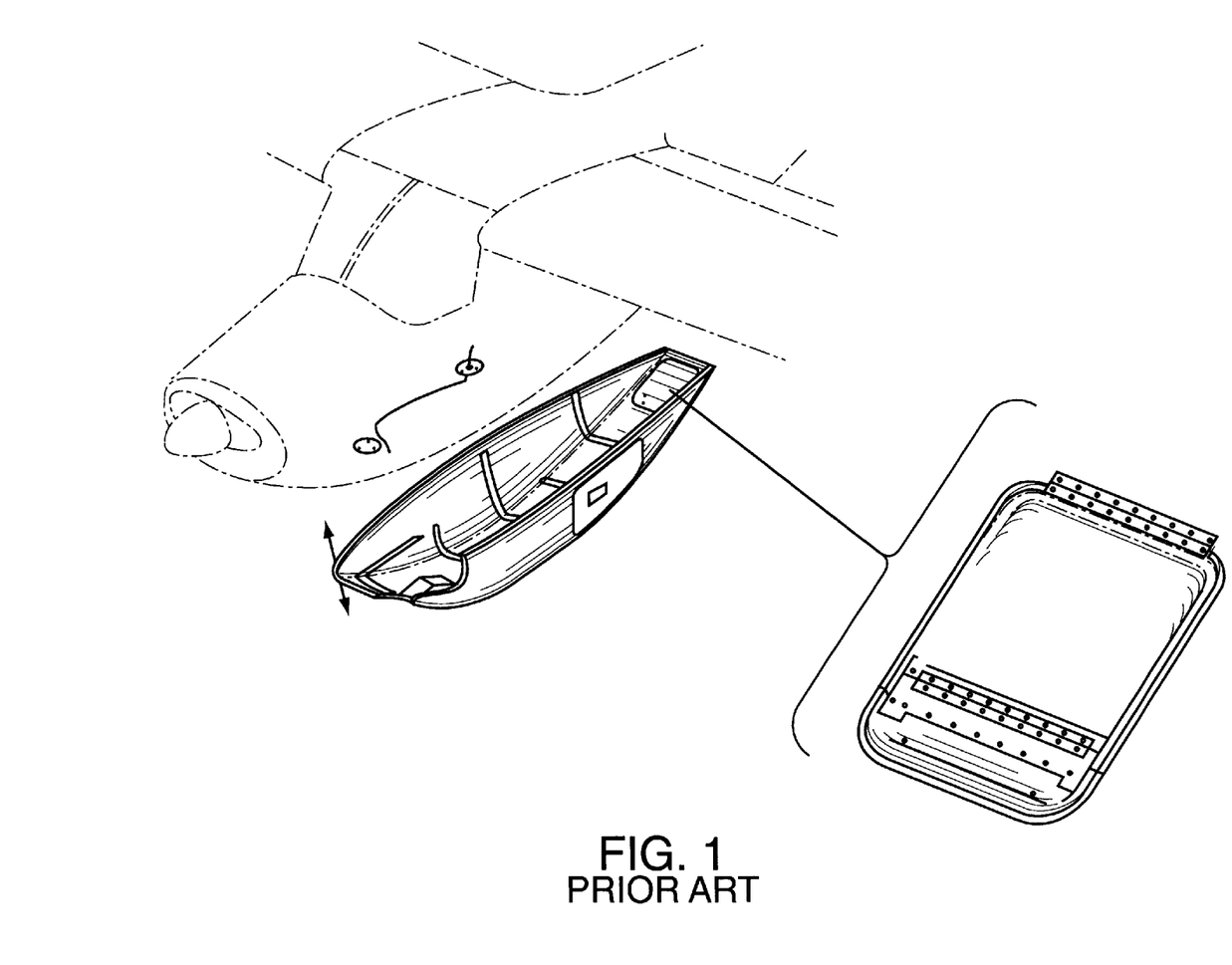
FIG. 1 is an exploded perspective view of the cargo pod of the prior art.
Figure 2:
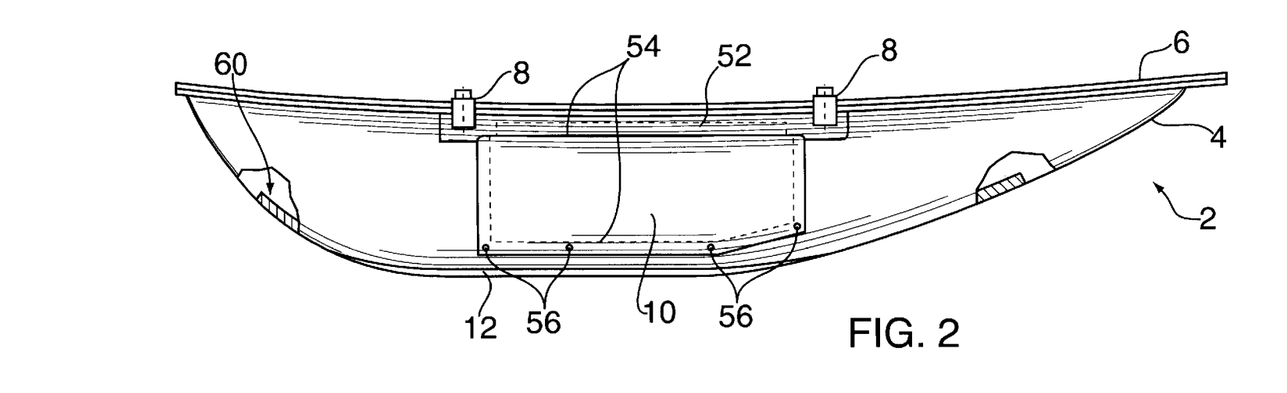
FIG. 2 is a side elevation of a cargo pod in accordance with the present invention.
Figure 3:
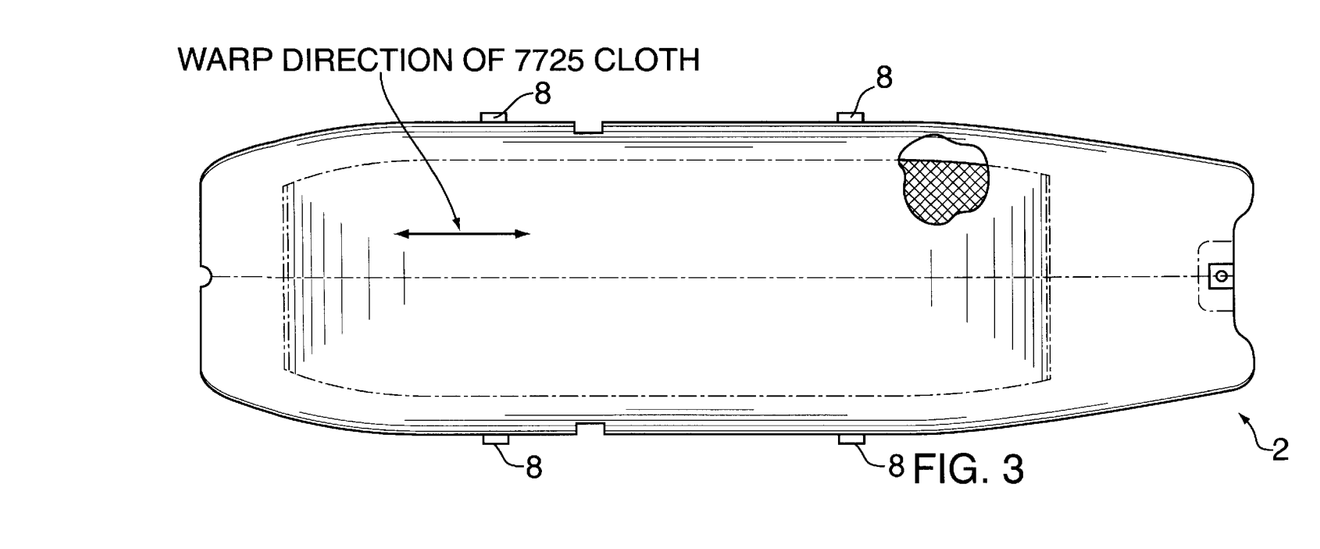
FIG. 3 is a plan view of a cargo pod in accordance with the present invention.
Figure 4:
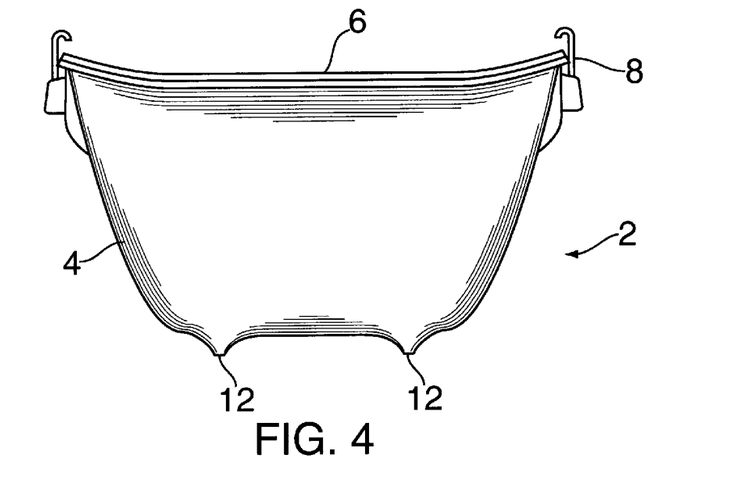
FIG. 4 is a front elevation of a cargo pod in accordance with the present invention.
Figure 5:
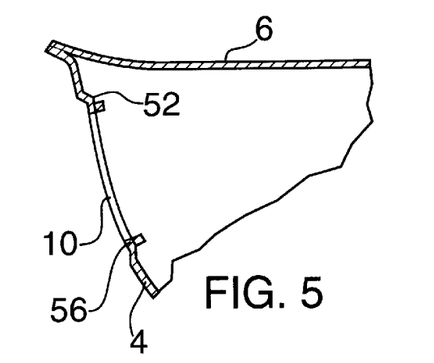
FIG. 5 is a partial front elevation in cross section at the area of the access door of a cargo pod in accordance with the present invention.

The present invention, in its preferred embodiment shown in FIGS. 2–4, is directed to an enclosed cargo pod 2 which is attached to light aircraft through the use of over center latches 8 on the pod 2.

Figure 6:
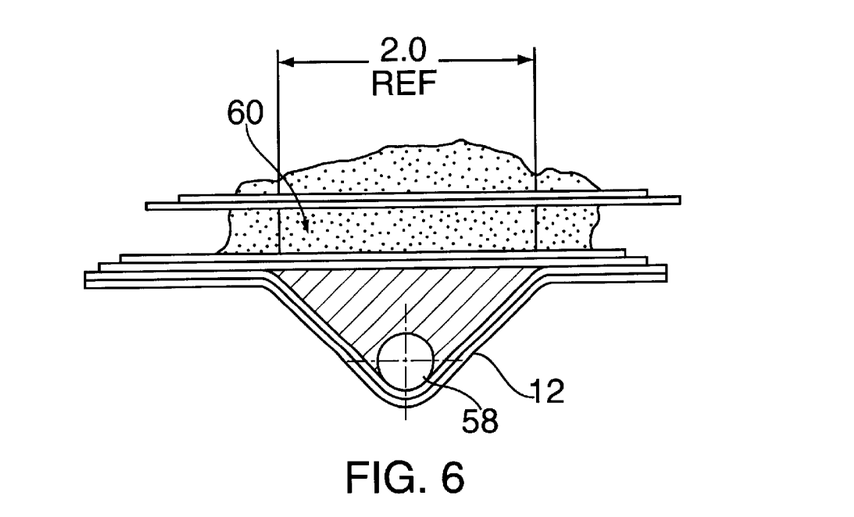
FIG. 6 is a cross sectional view of the bottom of a cargo pod in accordance with the present invention at the area of a skid runner.

The self-contained pod 2 is manufactured from a body component 4 and a lid component 6 which are preferably permanently sealed together to form the pod 2. The interior of the pod 2 is accessed by a door 10 on the side of the body 4. Skids 12, as shown in FIG. 6, are preferably formed on the bottom of the cargo pod 2 to provide protection to the pod 2 when disconnected from the aircraft.

Figure 8:
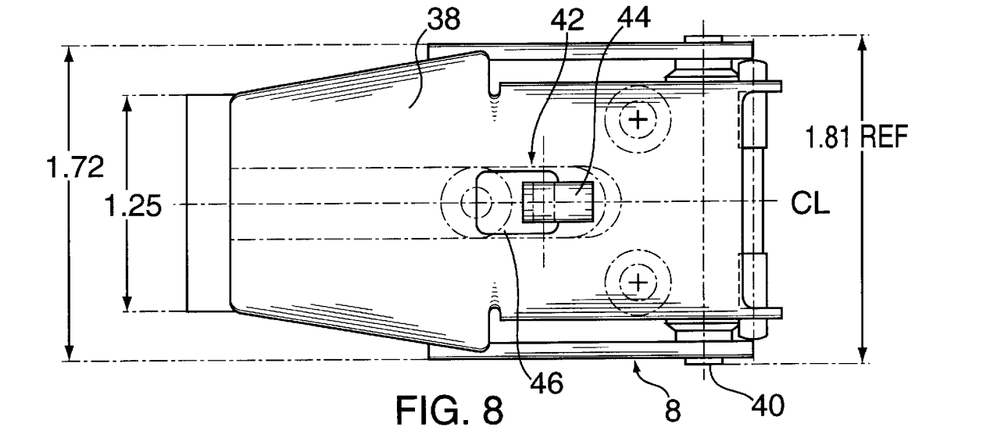
FIG. 8 is a plan view of a latching member in accordance with the present invention.
Figure 9:
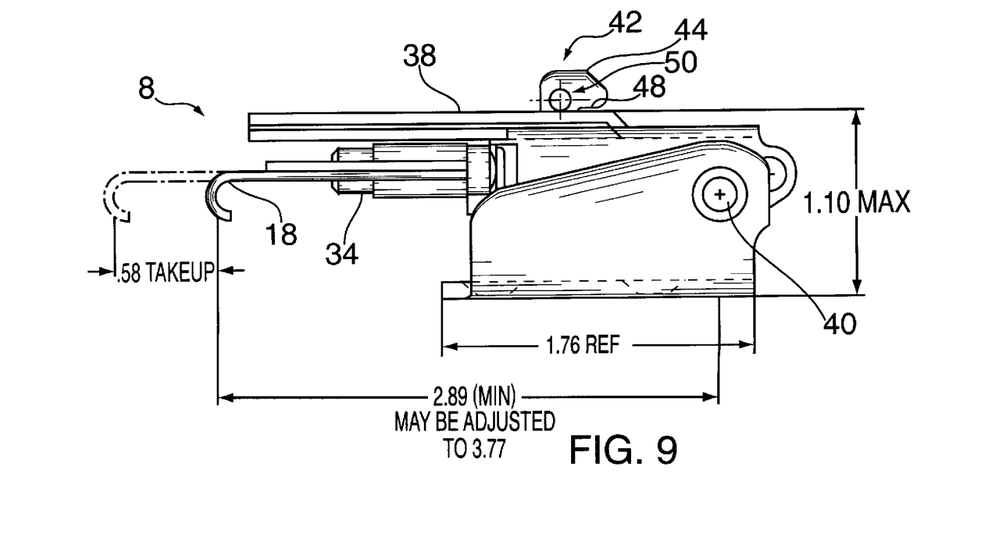
FIG. 9 is a side elevation of the latching member of FIG. 8.

The over center latch 8, shown in FIGS. 8 and 9, preferably comprises a base 36 which is permanently attached to the pod 2, a lever 38 fixed about a pivot 40 for moving the hook 18 from an open to a closed position. A hook 18 for engaging the retention member 16 is movable between an extended position and a fixed position when the lever 38 is moved from the open to the closed position. The throw of the hook 18 can preferably be adjusted by adjustment means 34 such as a threaded rod on which the hook means travels.

Figure 7:
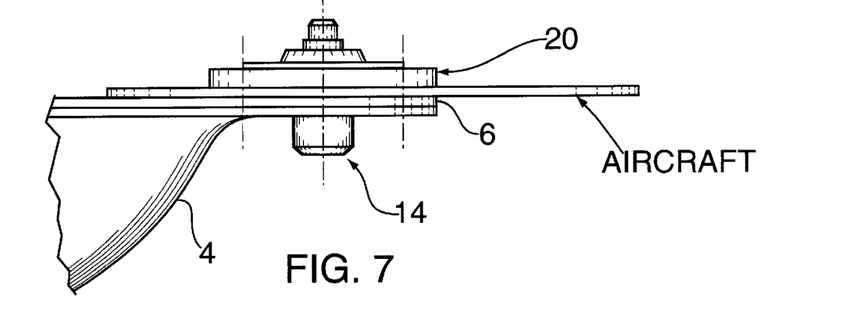
FIG. 7 is a partial side elevation of a cargo pod in accordance with the present invention including the positioning member.

The pod 2 is properly positioned on the aircraft by use of a positioning member 14, shown in FIG. 7, which is at least semi-permanently attached to the underside of the aircraft. Preferably, the positioning member 14 protrudes from the aircraft skin and is maintained by a backing plate 20 under the aircraft skin.

Figure 10:
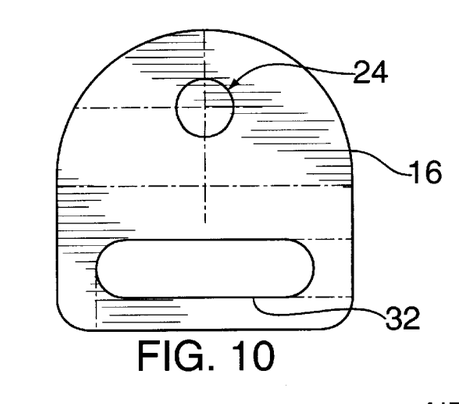
FIG. 10 is a plan view of the retention member which cooperates with the latching member of FIGS. 8 and 9.
Figure 10A:
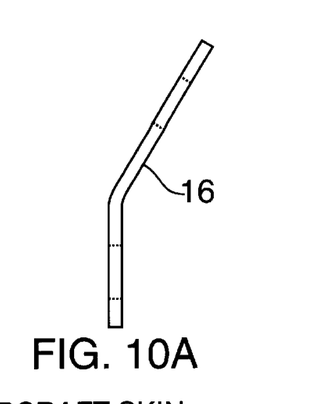
FIG. 10A is a side elevation of the retention member of FIG. 10.

When properly positioned, the over center latches 8 align with cooperating retention members 16. The retention members 16, shown in FIGS. 10 and 10A, are at least semi-permanently attached to the aircraft. Preferably, attachment of the retention member 16 to the aircraft is through the use of a bolt 22 which passes through an aperture 24 in the retention member 16 and engages a nut 26 and washer 28 on a backing plate 30.

Figure 11:
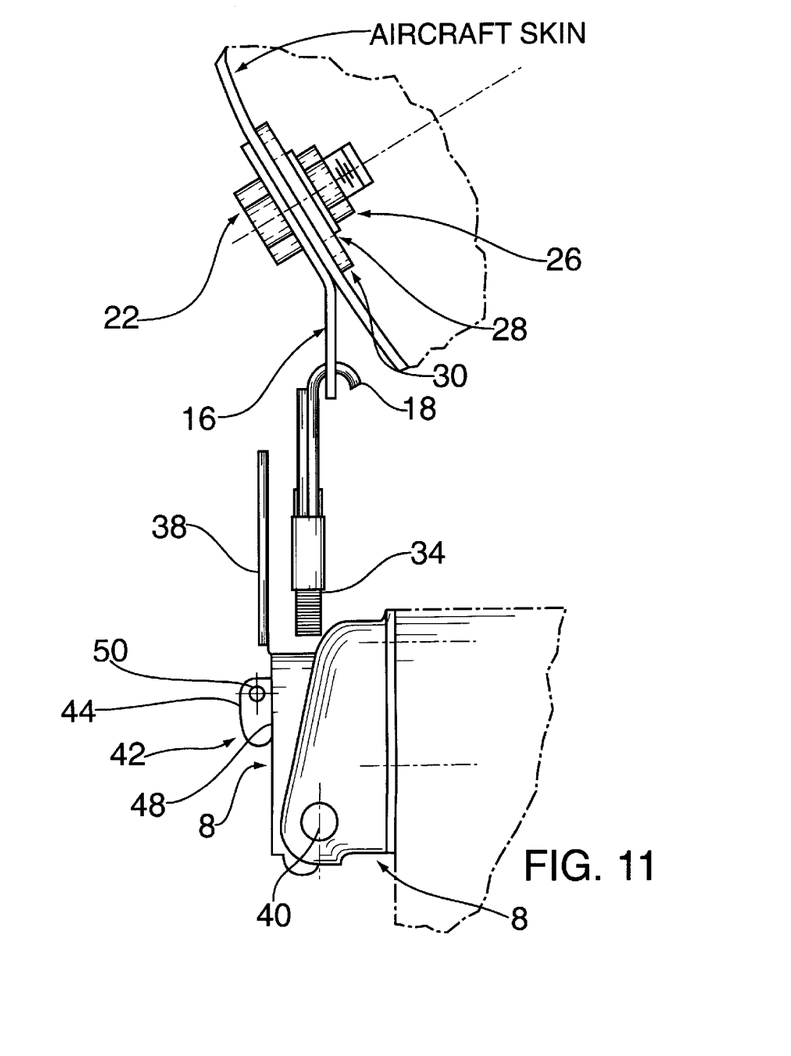
FIG. 11 is a partial elevation of the latching member engaging the retention member in accordance with the present invention.

The retention member 16 preferably has a slot 32 to receive cooperating hook means 18 of the latch 8. Preferably, the slot 32 is on a portion of the retention member 16 which angles away from the aircraft (see FIGS. 10–11).

To ensure that the latch 8 stays closed during flight, locking means 42 are preferably incorporated therewith. In the most preferred embodiment, a tab 44 extends from the base through an opening 46 in the lever 38. The tab 44 is preferably spring loaded so that a catch 48 is forced over the edge of the opening 46 thereby preventing the lever 38 from moving into its open position. Additionally, the tab 44 also includes an aperture 50 for receiving a pin, lock or the like to ensure that the lever cannot be opened.

Figure 12:
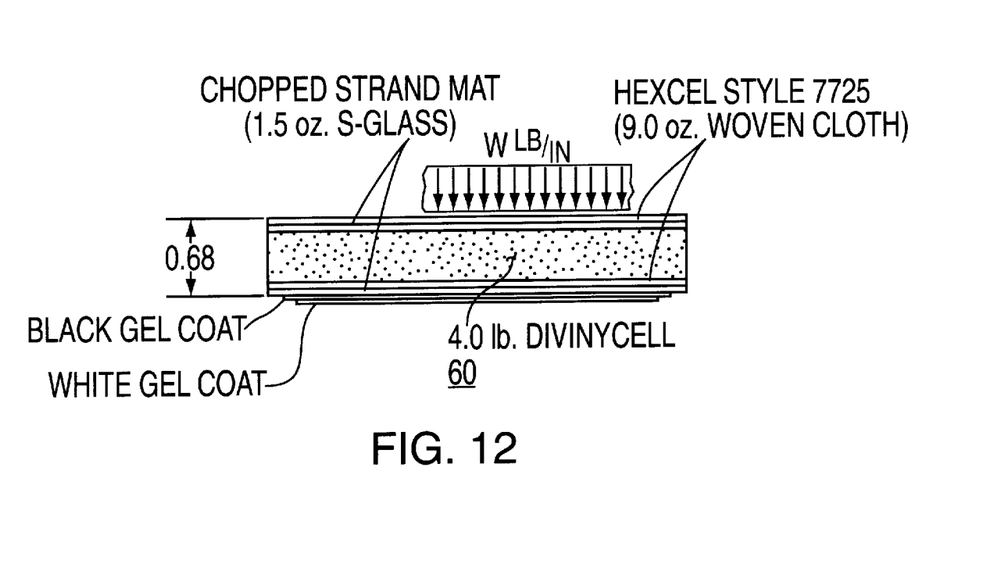
FIG. 12 is a cross sectional view of the floor portion of a cargo pod made in accordance with the preferred embodiment of the present invention.
Figure 13:
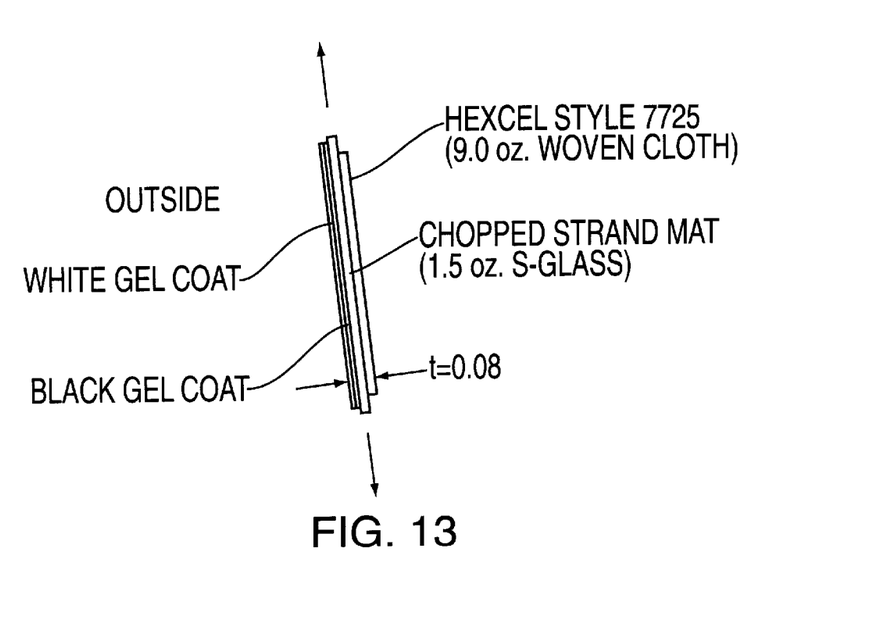
FIG. 13 is a cross sectional view of the wall portion of a cargo pod made in accordance with the preferred embodiment of the present invention.

As shown in FIG. 12, the floor of the body 6 of the pod 2 is preferably made of a fiberglass laminate having a 4.016 divinyl cell foam 60, as used in aircraft construction, between fiberglass layers. The walls of the body 4 of the pod 2, as shown in FIG. 13, is preferably made of a fiberglass laminates. The materials allow for a very strong structure with a minimum of weight. The structural rigidity is further enhanced by the use of only a single access door 10.

In the area of the skid 12, as shown in FIG. 6, the fiberglass is reinforced with an aluminum rod 58 which runs the length of the skid 12. Resin layers cover the rod 58 which is set in an adhesive filler material.

The door 10 is preferably a "plug type" door having a foam layer for strength and rigidity, wherein no hinges are used. Rather, an extended bearing surface 52 slips into the interior of the pod 2 at the edge of the door opening 54 and rests upon the interior wall of the body 4. The door 10 is then pushed onto the opening 54, with the door 10 overlapping the exterior sides of the opening 54. Fastening members 56 along the bottom of the door 10 maintain the door 10 in the closed position. Most preferably, the fastening members 56 are cam lock fasteners such as Zeus type fasteners which securely maintain the door 10 in a closed position.

It is preferred that the door 10 be made as large as possible to ease loading and unloading and provide for bulk cargo.

Figure 14:
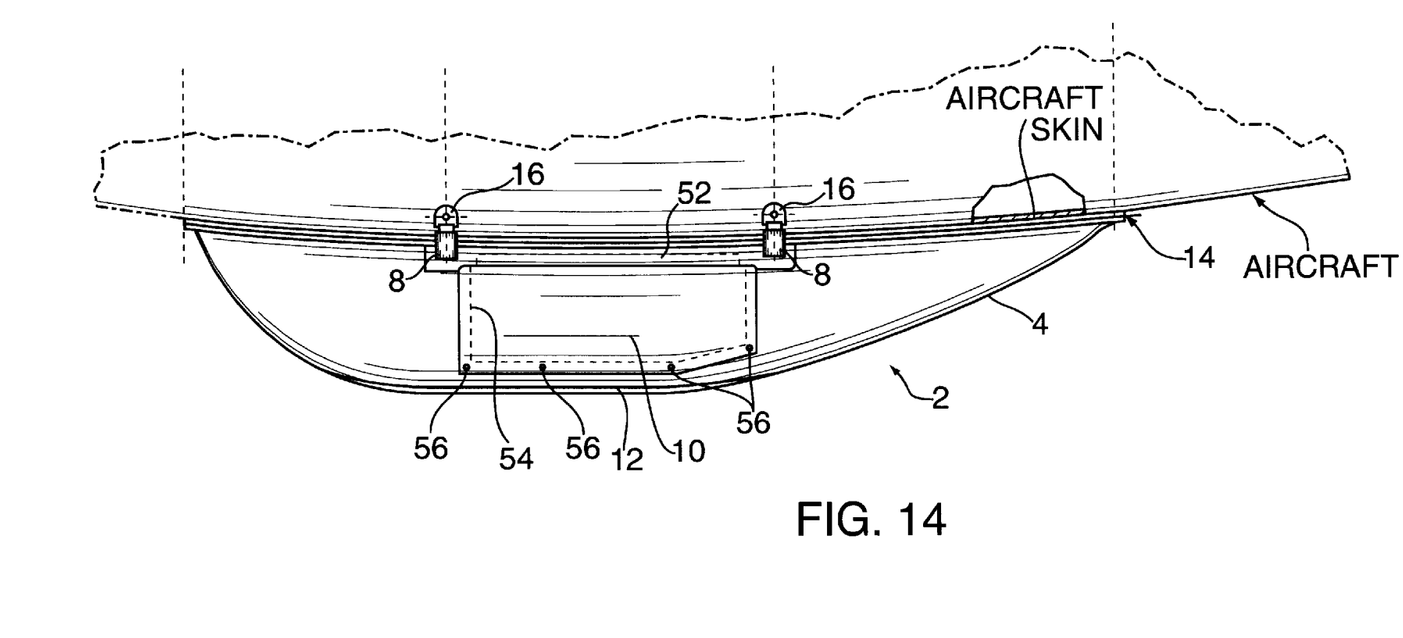
FIG. 14 is an elevation of the preferred cargo pod of the present invention attached to an aircraft.

The pod 2 of the present invention as installed on an aircraft is shown in FIG. 14. As can be seen, the positioning member 14 aligns the pod 2 on the aircraft and the latches 8 engage the retention members 16 which are mounted on the aircraft. Preferably a felt, rubber or other similar material is placed between the lid portion 6 of the pod 2 and the aircraft to avoid scratching and noise when attached.

Tie-down lugs, rings or the like, including D-rings and/or split rings, etc. 62 are preferably attached on the interior floor of the pod 2 to secure the contents of the pod 2.

The lid 6 of the pod 2 preferably conforms substantially to the contour of the belly of the aircraft. The body portion 4 of the pod 2 preferably conforms to an aerodynamical shape for reduced drag, as shown in the FIGURES. A preferred pod 2 for a CESSNA 185 is preferably about 33 inches wide, about 114 inches long and about 18 inches high. The access door 10 is preferably about 36 inches long by about 11 inches high.

Fuel drains and/or antennas which may be located on the belly of the plane in the area of attachment of the pod may be moved forward, back or to the side of the pod, as appropriate.

An example of the preferred manufacturing process of the pod 2 to be mounted externally on the belly of a CESSNA 185 aircraft follows. Three molds are contemplated, the main body mold, the lid mold and the access door mold. The molds are conditioned and finished, to provide an appropriate surface, as known in the art. A suitable release material, such as a paste mold release wax, is applied to the mold prior to use.

The following composite materials are utilized during the manufacturing (lay-up process) of the luggage pod:

| Item | Manufacturer | Spec. No. |
| --- | --- | --- |
| 1.5 oz. chopped strand mat (S-glass) | Vetrotex Certainteed | M127 |
| 9.0 oz. woven cloth (E-glass) | Hexcel | Style 7725 |
| Sandwich core | | |
| (4.0 lb. divinycell) | Barracuda Tech | H-60 |
| (5.0 lb. divinymat) | Barracuda Tech | H-80 |
| Resin (polyester) | Cargill Products | 287-8655 |
| Resin thickener | Cabot Corp. | Cabosil |
| Adhesive (epoxy) | Jeffco Products | 1308 |
| Adhesive hardener | Jeffco Products | 1109 |
| Adhesive filler (epoxy/alum. paste) | Ciba-Geigy Corp. | RP-1258 |
| White gel coat | Neste Polyester Inc. | UG-0509 |
| Black gel coat | Neste Polyester Inc. | BG-3700 |
| Parting agent (mold release paste) | T.R. Industries | TR-102 |
| Adhesive caulk | Any major brand | Silicone |

When fabricating the composite portion of the luggage pod the working temperature range should be limited between 65° F. and 85° F.

In order to maintain quality assurance, careful visual examinations are employed to all components of the luggage pod during and at the conclusion of each manufacturing process. Crazing, scratches, blisters, resin-starved areas, wrinkles, voids and delaminations are all considered defects during inspection.

A detailed example of the preferred steps for the production of the various sections contemplated in manufacture of a pod 2 of the present invention follows.

Main Pod

1. Apply three coats of parting agent to entire mold surface. This may be reduced to one coat when mold is seasoned.

2. Apply White Gel Coat with a spray gun to complete mold surface. Check with Gel Coat Wet Thickness Gage (max. thickness=0.010 inches).

3. Apply Black Gel Coat with a spray gun to mold initially coated with White Gel Coat. Check with Gel Coat Gage (combined thickness of white and black gel coat should be between 0.015 and 0.020 inches). Let cure for a minimum of two hours.

4. Fill strake cavity sections defined using adhesive filler with the aluminum rod 58 embedded as shown in FIG. 6.

5. Close off top of each strake cavity even with inside surface of pod bottom using two layers (2 inch wide strips) of 1.5 oz. chopped strand mat and general purpose resin.

6. Lay up on thickness of 1.5 oz. chopped strand mat over entire inside bottom surface of main pod mold using general purpose resin.

7. Lay up one thickness of 1.5 oz. chopped strand mat on each inside side surface of main pod mold overlapping the bottom mat by 3 inches. Use general purpose resin and cut shape(s) prior to lay-up.

8. Lay up one thickness of 9.0 oz. woven cloth on top of the chopped strand mat in bottom of pod using general purpose resin. Overlap the side layer of chopped strand mat by 3 inches.

9. Perform the following lay-up sequences at the four latch 8 attachment locations:
   1. Lay up five thicknesses of 9.0 oz. woven cloth using general purpose resin.

10. Lay up one thickness of 9.0 oz. woven cloth over existing mat on each side surface of mold overlapping the bottom cloth by 3 inches. Use general purpose resin and cut shapes prior to lay-up.

11. Lay up a 3 inch wide strip of 9.0 oz. woven cloth around pod door opening 46 using general purpose resin.

12. Perform the following lay-up sequences at the four latch attachment locations:
   1. Lay up five thicknesses of 9.0 oz. woven cloth using general purpose resin. Cut out shapes prior to lay-up.

Figure 15:
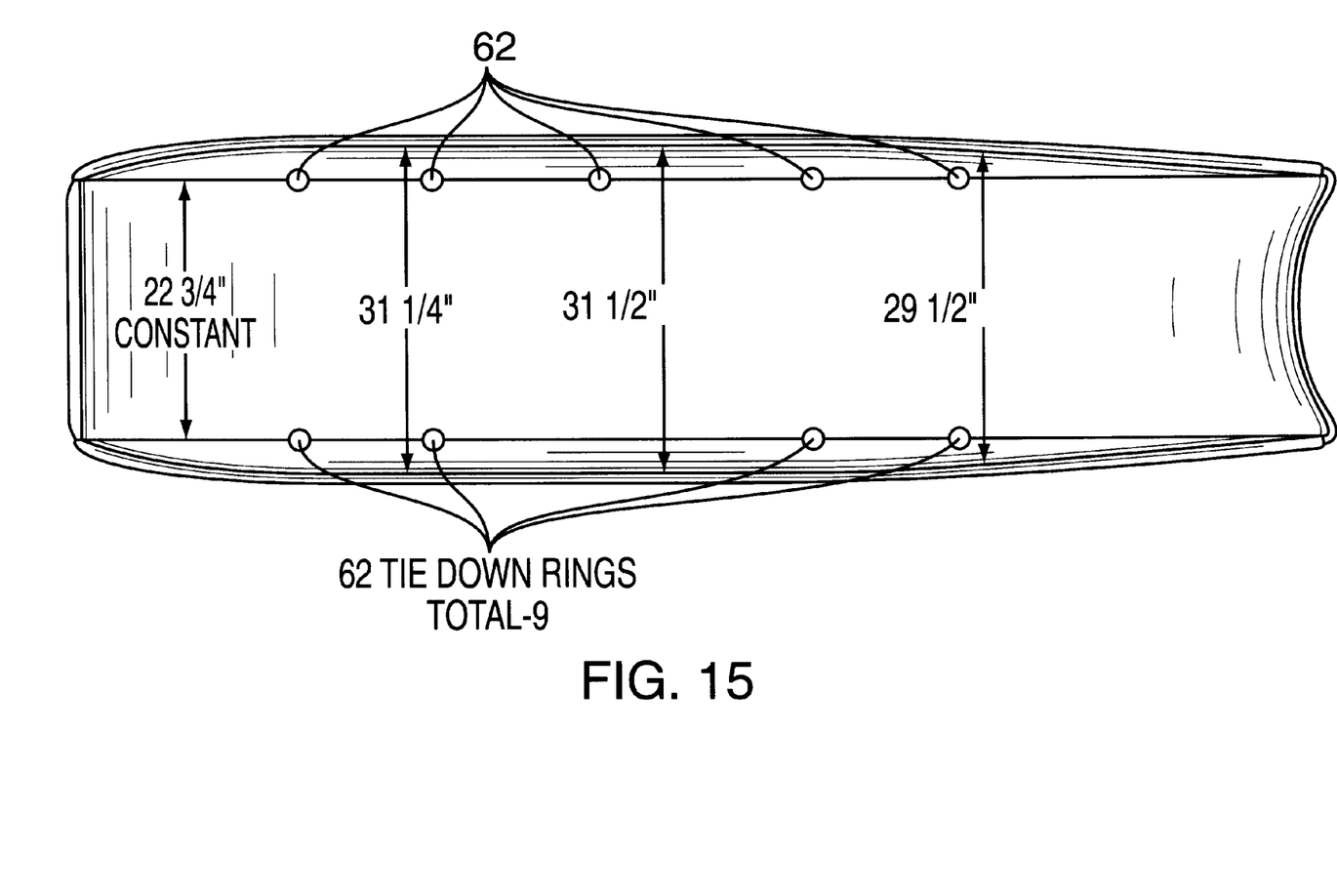
FIG. 15 is a plan view of the preferred interior floor of the pod having tie-down rings attached thereto.

13. Attach the nine aluminum tie-down lugs as shown in FIG. 15 to the surface of the woven cloth using general purpose resin. Let cure for a minimum of two hours.

14. Cut out shape of sandwich core for pod floor. Apply general purpose resin mixed with resin thickener to surface of woven cloth and lay up sandwich core into position.

15. Use the adhesive paste system to fill the discontinuity around the perimeter of the sandwich core thus creating a flush surface for laying up the inner laminate.

16. Lay up one thickness of 1.5 oz. chopped strand mat over the entire inside floor area of the pod. This mat should match the footprint of the outer laminate including the 3 inch overlap with the side laminate.

17. Lay up one thickness of 9.0 oz. woven cloth on top of the chopped strand mat using general purpose resin. Cloth should be identical in shape to the adjoining mat.

18. Finished pod thicknesses:

| | |
|---|---|
| 1. Side walls | 0.080 ± .010 inches |
| 2. Floor | 0.68 ± .03 inches |
| 3. Latch area | 0.220 ± .010 inches |
| 4. Door recess | 0.090 ± .005 inches |

Pod Lid

1. Apply three coats of parting agent to entire mold surface. This may be reduced to one coat when mold is seasoned.

2. Apply White Gel Coat with a spray gun to complete mold surface. Check with Gel Coat Wet Thickness Gage (max. thickness=0.010 inches).

3. Apply Black Gel Coat with a spray gun to complete mold surface initially coated with White Gel Coat. Check with Gel Coat Wet Thickness Gage (combined thickness of white and black gel coat should be between 0.015 and 0.020 inches). Let cure for a minimum of two hours.

4. Cut out shape of chopped strand mat for pod lid 6. Lay up in mold using general purpose resin.

5. Cut out shape of woven cloth for pod lid 6. Lay up in mold using general purpose resin.

6. Finished thickness of pod lid 6 should be between 0.090 and 0.110 inches.

Access Door

1. Apply three coats of parting agent to entire mold surface. This may be reduced to one coat when mold is seasoned.

2. Apply White Gel Coat with a spray gun to complete mold surface. Check with Gel Coat Wet Thickness Gage (max. thickness=0.010 inches).

3. Apply Black Gel Coat with a spray gun to complete mold surface initially coated with White Gel Coat. Check with Gel Coat Wet Thickness Gage (combined thickness of white and black gel coat should be between 0.015 and 0.020 inches). Let cure for a minimum of two hours.

4. Cut out shape of chopped strand mat for access door 10 using template. Lay up in mold using general purpose resin.

5. Cut out shape of woven cloth for access door 10 using template. Lay up in mold using general purpose resin. Allow to cure for a minimum of two hours.

6. Cut out shape of sandwich core for access door 10 using template.

7. Apply general purpose resin mixed with resin thickener to surface of woven cloth and lay up sandwich core into position.

8. Cut out shape of woven cloth for access door 10 using template. Lay up in mold using general purpose resin.

9. Finished access door thicknesses:

| | |
|---|---|
| 1. Core area | 0.20 ± .03 inches |
| 2. Edges (solid laminate) | 0.090 ± .010 inches |

Bonding Lid to Main Pod

1. From trim edge on lid 6 abrade (sand) 1.75 to 2.00 inches of laminate surface to prepare for bonding.

2. From trim edge of body 4 abrade (sand) 1.75 to 2.00 inches of laminate surface to prepare for bonding.

3. Prepare an adhesive from Mix Jeffco Laminating Epoxy with hardener, adding cabosil to mixture for thickening to paste consistency.

4. Bond 0.060 aluminum spacer to aft edge of the body 4 using adhesive prepared in step 3.

5. Apply a ⅛ inch thick ribbon of adhesive to the one inch wide bond surface of the body 4 and over the top surface of the aluminum spacer.

6. Invert body mold with body 4 included and mate to lid 6 in lid mold. Molds should be on flat surface to insure no distortion.

7. Check for good squeeze out of excess adhesive while clamping frames together. Clean squeezed out adhesive from trim edges and fill any gaps.

8. Smooth out adhesive along bond line on inside of pod 2 using a one inch brush screwed to a stick.

9. Allow 24 hours for complete cure of epoxy adhesive bond.

10. Remove lid 6 from lid mold.

11. Remove body 4 from body mold.

12. Grind/sand all trim edges.

Of course, obvious variations of the above described invention are intended to fall within the spirit and scope of this invention, to be limited solely by the appended claims. Prior art referred to herein is incorporated by reference.

I claim:

1. A cargo pod for light aircraft having a belly at the bottom of the aircraft comprising a sealed enclosure having access means for accessing the interior of the enclosure and attachment means for attaching the enclosure to the belly of the aircraft, said attachment means comprising at least two latches, each latch having engagement means for engaging cooperating retention means, said engagement means being movable from an open position to a closed position, and locking means for securing the latch in its closed position, wherein the latches are adapted to opposed sides of the belly of the aircraft corresponding to opposed sides of the enclosure.

2. The cargo pod of claim 1 further comprising at least one skid on the bottom of the enclosure upon which the enclosure can slide when detached from the aircraft.

3. The cargo pod of claim 1 wherein the access means is a plug door.

4. The cargo pod of claim 1 wherein the retention means has means for receiving the engagement means of the latch.

5. The cargo pod of claim 1 wherein the latch is fastened to the enclosure and the retention means is fastened to the aircraft.

6. The cargo pod of claim 1 further comprising positioning means for properly aligning the cargo pod on the aircraft.

7. The cargo pod of claim 1 wherein the enclosure includes 4 attachment means.

8. The cargo pod of claim 1 wherein the enclosure comprises a fiberglass laminate.

9. The cargo pod of claim 8 wherein the floor of the enclosure includes foam between laminate layers.

10. The pod of claim 1 wherein the latch further comprises an over center latch including a lever for moving said engagement means from said open position to said closed position.

11. The pod of claim 1 further comprising adjustment means for adjusting the extension of the engagement means when in the closed position.

12. The cargo pod of claim 11 wherein the adjustment means comprises a threaded rod associated with the engagement means.

13. The cargo pod of claim 1 wherein the locking means comprises a spring loaded latch.

14. The cargo pod of claim 13 wherein the locking means comprises an aperture for accepting a pin or lock to physically prohibit the latch from moving into its open position.

15. The cargo pod of claim 2 wherein the at least one skid includes a steel bar covered in fiberglass.

16. The cargo pod of claim 3 wherein the door includes means for engaging the interior of the access means and means for securing the door in a closed position.

17. The cargo pod of claim 13 wherein the locking means comprises a cam lock fastener.

* * * * *